United States Patent
Tang et al.

(10) Patent No.: US 12,487,879 B2
(45) Date of Patent: Dec. 2, 2025

(54) ANOMALY DETECTION ON DYNAMIC SENSOR DATA

(71) Applicants: NEC Laboratories America, Inc., Princeton, NJ (US); NEC Corporation, Tokyo (JP)

(72) Inventors: LuAn Tang, Pennington, NJ (US); Haifeng Chen, West Windsor, NJ (US); Yuncong Chen, Plainsboro, NJ (US); Wei Cheng, Princeton Junction, NJ (US); Zhengzhang Chen, Princeton Junction, NJ (US); Yuji Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 410 days.

(21) Appl. No.: 18/152,546

(22) Filed: Jan. 10, 2023

(65) Prior Publication Data

US 2023/0236927 A1  Jul. 27, 2023

Related U.S. Application Data

(60) Provisional application No. 63/302,250, filed on Jan. 24, 2022, provisional application No. 63/302,249, filed on Jan. 24, 2022.

(51) Int. Cl.
*G06F 11/07* (2006.01)
*G06N 3/0455* (2023.01)

(52) U.S. Cl.
CPC ...... *G06F 11/0793* (2013.01); *G06F 11/0721* (2013.01); *G06N 3/0455* (2023.01)

(58) Field of Classification Search
CPC ............ G06F 11/0793; G06F 11/0721; G06N 3/0455; G06N 3/0442; G06N 3/084
See application file for complete search history.

(56) References Cited

U.S. PATENT DOCUMENTS

2006/0229743 A1 * 10/2006 Boe .................. G05B 13/042
  700/44
2010/0084287 A1 * 4/2010 Teramoto ........... G01N 27/4067
  205/785

(Continued)

FOREIGN PATENT DOCUMENTS

WO  WO-2017216647 A1 * 12/2017  ........ G05B 23/0243
WO  WO-2021171303 A1 * 9/2021

OTHER PUBLICATIONS

Cheng et al., "Meta multi-task learning for sequence modeling", Proceedings of the AAAI Conference on Artificial Intelligence. vol. 32, No. 1. Apr. 27, 2018, pp. 5070-5077.

(Continued)

*Primary Examiner* — Santosh R Poudel
(74) *Attorney, Agent, or Firm* — Vincent Duffy; Joseph Kolodka (57) ABSTRACT

Methods and systems for anomaly detection include determining whether a system is in a stable state or a dynamic state based on input data from one or more sensors in the system, using reconstruction errors from a respective stable model and dynamic model. It is determined that the input data represents anomalous operation of the system, responsive to a determination that the system is in a stable state, using the reconstruction errors. A corrective operation is performed on the system responsive to a determination that the input data represents anomalous operation of the system.

16 Claims, 6 Drawing Sheets

(56) References Cited

U.S. PATENT DOCUMENTS

| | | | |
|---|---|---|---|
| 2019/0095266 A1* | 3/2019 | Chen | G06N 20/00 |
| 2020/0364579 A1* | 11/2020 | Misu | G06N 3/084 |
| 2021/0012190 A1* | 1/2021 | Murali | G06Q 10/04 |
| 2021/0098078 A1* | 4/2021 | Lozac'hmeur | G16B 20/00 |
| 2021/0120031 A1* | 4/2021 | Dokucu | G06N 3/088 |
| 2021/0164334 A1* | 6/2021 | Chen | E21B 44/00 |
| 2023/0315048 A1* | 10/2023 | Kumar | G06F 30/27 |
| | | | 700/118 |

OTHER PUBLICATIONS

Kirsch et al., "Modular networks: Learning to decompose neural computation", 32nd Conference on Neural Information Processing System. vol. 31. Dec. 2018, pp. 2408-2418.

\* cited by examiner

ANOMALY DETECTION ON DYNAMIC SENSOR DATA

RELATED APPLICATION INFORMATION

This application claims priority to U.S. Patent Application No. 63/302,249, filed Jan. 24, 2022, and to U.S. Patent Application No. 63/302,250, filed on Jan. 24, 2022, both incorporated herein by reference in their entirety.

BACKGROUND

Technical Field

The present invention relates to system monitoring and, more particularly, to anomaly detection in systems that have periods stable operation and periods of dynamic operation.

Description of the Related Art

Internet of things (IoT) systems may include a number of different networked devices, each of which may operate independently and may collect data from any appropriate cyber-physical system. The collected data may be used to characterize the operational characteristics of the cyber-physical system, for example to determine when the cyber-physical system may be operating outside its expected normal parameters.

SUMMARY

A method for anomaly detection includes determining whether a system is in a stable state or a dynamic state based on input data from one or more sensors in the system, using reconstruction errors from a respective stable model and dynamic model. It is determined that the input data represents anomalous operation of the system, responsive to a determination that the system is in a stable state, using the reconstruction errors. A corrective operation is performed on the system responsive to a determination that the input data represents anomalous operation of the system.

A method of training a neural network includes training a general model using training data that represents normal operation of a system, including periods of stable operation and periods of dynamic operation. The training data is classified to identify the periods of stable operation and periods of dynamic operation using the general model. A stable model is trained using periods of stable operation of the training data. A dynamic model is trained using periods of dynamic operation of the training data.

A system for anomaly detection includes a hardware processor and a memory that stores a computer program. When executed by the hardware processor, the computer program causes the hardware processor to determine whether a system is in a stable state or a dynamic state based on input data from one or more sensors in the system, using reconstruction errors from a respective stable model and dynamic model, to determine that the input data represents anomalous operation of the system, responsive to a determination that the system is in a stable state, using the reconstruction errors, and to perform a corrective operation on the system responsive to a determination that the input data represents anomalous operation of the system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Machine learning models may be used to classify the behavior of a cyber-physical system by monitoring time series data collected and reported from a variety of different sensors within the cyber-physical system. However, normal operation of a given cyber-physical system may include periods of stable behavior and periods of dynamic behavior.

Normal dynamics may be caused by user operations or behavior internal to the system. During periods of normal operation, normal dynamics can cause significant changes to sensor measurements. For systems that identify anomalous behavior, normal dynamics may trigger false positives. In addition, it can be difficult to obtain training data of normal dynamics and anomaly events, as these events may be relatively rare compared to the stable operation of the system.

A machine learning model may nonetheless me trained to accurately identify normal dynamics and anomalous conditions without training data that is specific to those types of events. A first model may be trained using training data that represents normal behavior of the system, including data that represents both stable and dynamic periods. The first model may be used to reconstruct historical data. Based on the reconstruction error, the historical data can be grouped into a "normal stable" class and a "normal dynamic" class. Separate machine learning models may then be trained for the normal stable data and the normal dynamic data. These models may be used to identify different types of normal operation for the cyber-physical system.

During operation, sensor data may only be checked for anomalous behavior in stable periods of operation. During dynamic periods of operation, the sensor data may be ignored as it may not be possible to tell the difference between normal dynamic operation and anomalous behavior. This improves the accuracy of the anomaly detection system, as false positives from normal dynamic operation are avoided.

Figure 1:
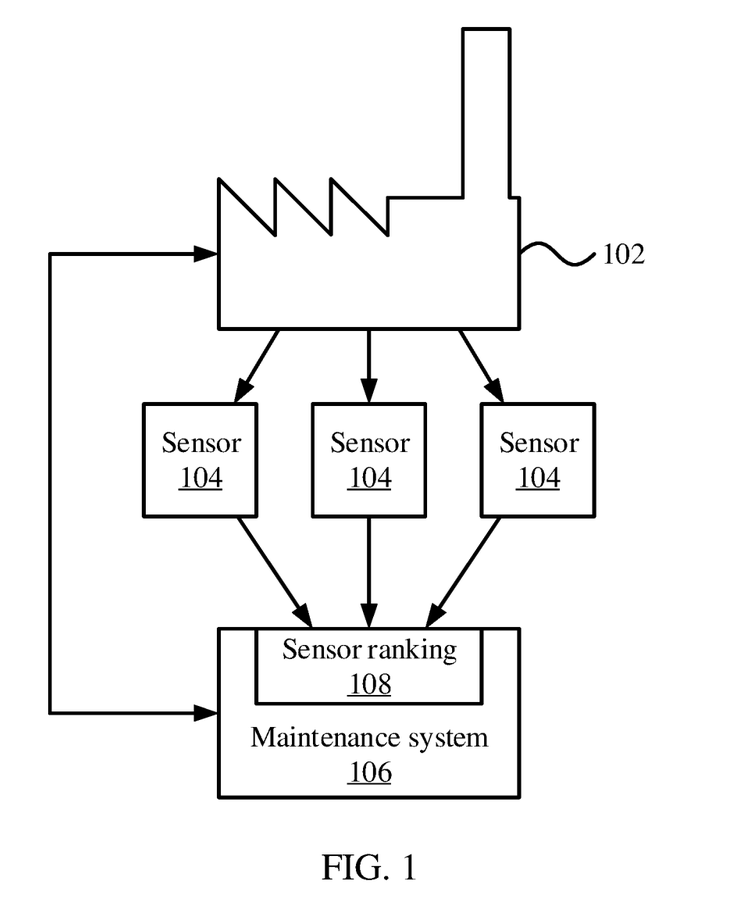
FIG. 1 is a block diagram of a monitored system that generates multivariate time series sensor data, in accordance with an embodiment of the present invention.

Referring now in detail to the figures in which like numerals represent the same or similar elements and initially to FIG. 1, a maintenance system 106 in the context of a monitored system 102 is shown. The monitored system 102 can be any appropriate system, including physical systems such as manufacturing lines and physical plant operations, electronic systems such as computers or other computerized devices, software systems such as operating systems and applications, and cyber-physical systems that combine physical systems with electronic systems and/or software systems. Exemplary systems 102 may include a wide range of different types, including railroad systems, power plants, vehicle sensors, data centers, and transportation systems.

One or more sensors 104 record information about the state of the monitored system 102. The sensors 104 can be any appropriate type of sensor including, for example, physical sensors, such as temperature, humidity, vibration, pressure, voltage, current, magnetic field, electrical field, and light sensors, and software sensors, such as logging utilities installed on a computer system to record information regarding the state and behavior of the operating system and applications running on the computer system. The information generated by the sensors 104 can be in any appropriate format and can include sensor log information generated with heterogeneous formats.

The sensors 104 may transmit the logged sensor information to an anomaly maintenance system 106 by any appropriate communications medium and protocol, including wireless and wired communications. The maintenance system 106 can, for example, identify abnormal or anomalous behavior by monitoring the multivariate time series that are generated by the sensors 104. Once anomalous behavior has been detected, the maintenance system 106 communicates with a system control unit to alter one or more parameters of the monitored system 102 to correct the anomalous behavior.

Exemplary corrective actions include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. The maintenance system 106 thereby automatically corrects or mitigates the anomalous behavior. By identifying the particular sensors 104 that are associated with the anomalous classification, the amount of time needed to isolate a problem can be decreased.

Each of the sensors 104 outputs a respective time series, which encodes measurements made by the sensor over time. For example, the time series may include pairs of information, with each pair including a measurement and a timestamp, representing the time at which the measurement was made. Each time series may be divided into segments, which represent measurements made by the sensor over a particular time range. Time series segments may represent any appropriate interval, such as one second, one minute, one hour, or one day. Time series segments may represent a set number of collection time points, rather than a fixed period of time, for example covering 100 measurements.

The monitored system 102 may have multiple operational states. For example, the monitored system 102 may have an active state and an idle state, each of which may represent normal operation. When the monitored system 102 changes from one state to another, for example due to a user's instructions or changes in the system's workload, the measured time series data may go through a period of dynamic operation before settling into a new stable state. Dynamic operation may also include transient responses to inputs to the monitored system 102, for example if the system 102 enters a new environment or environmental conditions change around the system. This dynamic operation is part of the expected, normal behavior of the monitored system 102 and so is not anomalous.

The maintenance system 106 therefore includes a model that is trained to differentiate between stable and dynamic normal behavior. The maintenance system 106 may use the output of the various sensors 104 to first determine whether the system 102 is in a dynamic or a stable state, for example using a pair of machine learning models, one trained to recognize stable behavior and the other trained to recognize dynamic behavior. If the system 102 is in a stable state, the maintenance system 106 may then determine whether the output of the sensors 104 represents an anomalous operating condition.

In one particular example, where the monitored system 102 includes a railroad switch, a dataset may be collected from a set of sensors 104 on the railroad switch. Each sensor may record a respective time series at a rate of about one measurement every 0.05 seconds. When the switch has mechanical problems, which may be understood to be an anomalous state, the recorded sensor data is different from that which is recorded during normal operation. Signal changes make up a significant part of the original data and also represent part of the normal operation of the switch, but cause changes to the recorded sensor data which may be much larger than those caused by a mechanical failure.

It is difficult to detect anomalies that cause changes to the measured data that are relatively small compared to the normal operation of a system, and this can result in a large number of false positives. In addition, the number of periods of dynamic operation (e.g., signal changes for the switch) may be very large, so that it is not reasonable to manually label the exact start and stop points of each switch operation.

Figure 2:
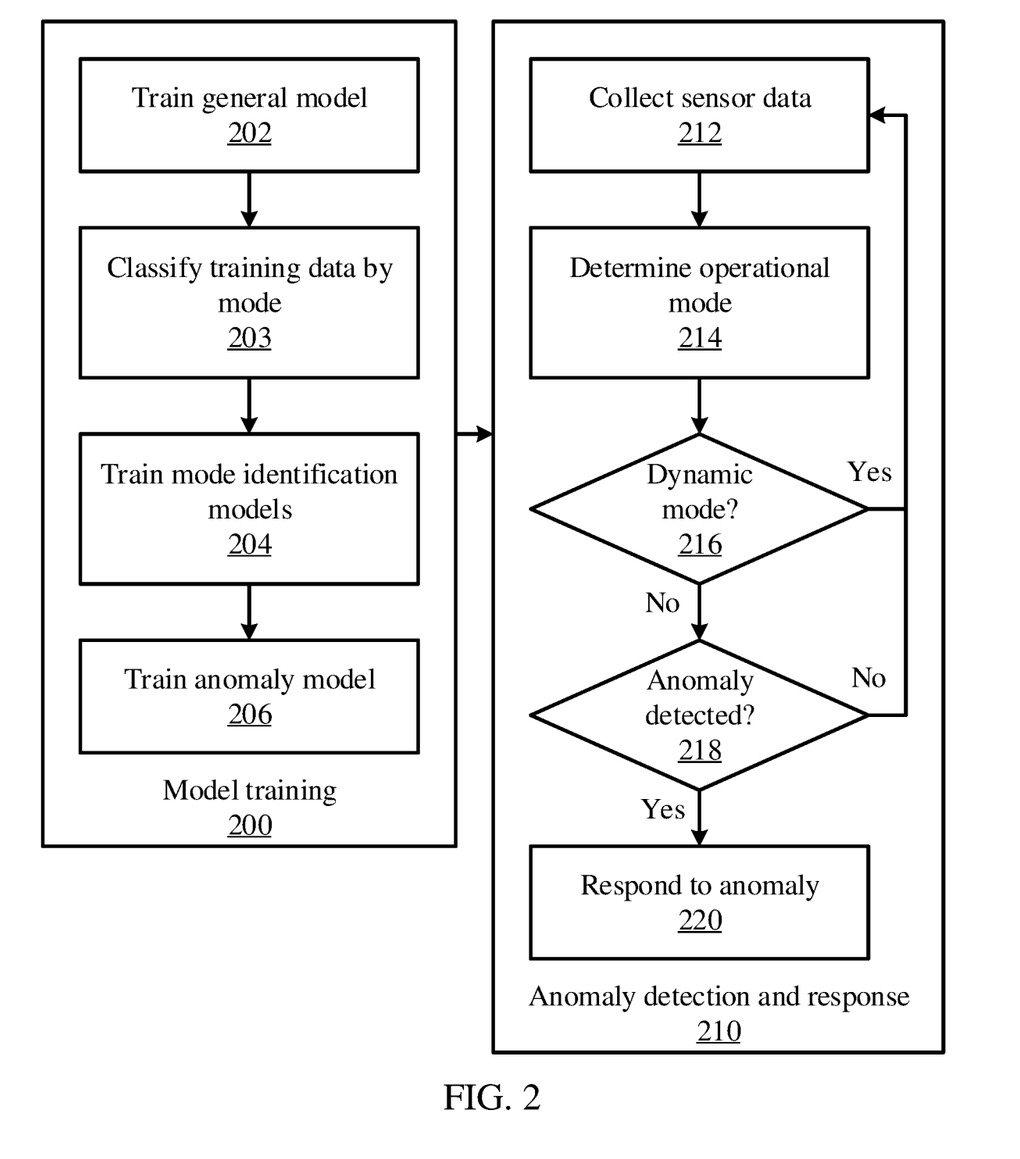
FIG. 2 is block/flow diagram of a method for training and using an anomaly detection model that is sensitive to whether a system is in a stable or dynamic state, in accordance with an embodiment of the present invention.

Referring now to FIG. 2, a method of training and using an anomaly detection model is shown. Block 200 shows steps for training a parts of an anomaly detection model and block 210 shows how the model may be used to monitor sensor data, detect anomalous behavior, and respond to the anomaly.

Block 202 trains a general model based on a set of training data for a given monitored system 102. The training data may include data recorded by sensors 104 during normal operation of the system 102, including periods of stable operation and periods of dynamic operation. The general model may be used to identify which portions of the training dataset reflect stable operation and which portions reflect dynamic operation in block 203.

The general model may be implemented as a long-short term memory (LSTM) autoencoder. The general model may therefore include two distinct parts—an LSTM encoder and an LSTM decoder. The LSTM encoder encodes a set of input data to generate a set of compressed features. The compressed features may, for example, have a lower dimensionality than the input data. The LSTM decoder may then attempt to reconstruct the input data using the compressed features, generating reconstructed data. By comparing the reconstructed data to the original input data, a reconstruction error may be determined, which may be used to differentiate between stable and dynamic operation. In particular, larger errors are produced when the input data is measured during a dynamic period than when the input data is measured during a stable period.

Following the above example of the railroad switch with nine sensors, the total dimension of the input data in the example is nine. The LSTM encoder may embed the data into a lower-dimensional space (e.g., five dimensions), and the LSTM decoder takes that lower-dimension data and generates an output at the original dimensionality (e.g., nine dimensions). The reconstruction error may simply be the difference between the reconstructed data and the original data. Block 203 may therefore classify the input data into categories by, e.g., comparing the reconstruction to a predetermined threshold value.

Block 204 trains mode identification models using the classified training data, including a stable model and a dynamic model. The mode identification models may include a stable model, trained on training data that is classified as being stable, and a dynamic model, trained on training data that is classified as being dynamic, each of which may be implemented as a respective LSTM autoencoder model. During training, block 204 may adjust gradients of the autoencoder models to minimize the reconstruction error for the respective classified training datasets. The training process may further generate a pair of reconstruction errors, including a stable reconstruction error that results from applying the stable model to the training data and a dynamic reconstruction error that results from applying the dynamic model to the dynamic training data. The respective stable and dynamic reconstruction errors $\text{Train}_{stable}$ and $\text{Train}_{dynamic}$ may be calculated as:

$$\text{Train}_{stable} = \frac{|R_{train} - R_{stable}|}{|R_{train}|}$$

$$\text{Train}_{dynamic} = \frac{|R_{train} - R_{dynamic}|}{|R_{train}|}$$

where $R_{train}$ is the original training data, $R_{stable}$ is the reconstruction of the original training data by the stable model, and $R_{dynamic}$ is the reconstruction of the original data by the dynamic model. The difference is expressed as an absolute value to capture that the size of the difference, rather than the direction of the difference (e.g., whether the reconstructed value is larger or smaller than the original). A relatively large difference suggests that the model is not well trained for the given input, whereas a relatively small difference suggests that the input is similar to inputs used during training.

Block 206 trains an anomaly detection model to calculate an anomaly score that reflects the likelihood that a given input multivariate time series segment represents anomalous behavior of the system 102. The anomaly detection model similarly be implemented as an LSTM autoencoder and may be trained using the entire body of normal training data, with a reconstruction error of the anomaly detection model providing the anomaly score.

During operation of the system 102, block 210 may perform anomaly detection and respond to and anomalies that are found. Block 212 collects new operational sensor data from the sensors 104 of a deployed system 102. The new operational sensor data may include segments that represent sliding time windows along the time series generated by the sensors 104. The length of the window and the speed at which the window slides may be determined based on domain knowledge for the system 102. Thus, the input to the model may include a set of measurements for each sensor 104 taken within the window, represented as $R_{i,w}$, where i indicates the sensor and w indicates the window. The LSTM part of the LSTM autoencoder structure generates an output that considers the entire sequence from each time series.

Block 214 determines an operational mode represented by the new sensor data using the stable model and the dynamic model, for example determining whether the system 102 is in a stable state or a dynamic state. For each testing window $R_w$, both the stable model and the dynamic model are applied to the input data, which is compressed and reconstructed. The reconstruction errors may be computed as:

$$\text{Residual}_{stable} = \frac{|R_w - R_{w,stable}|}{|w|}$$

$$\text{Residual}_{dynamic} = \frac{|R_w - R_{w,dynamic}|}{|w|}$$

where $R_{w,stable}$ is a reconstruction of the testing window $R_w$ by the stable model, $R_{w,dynamic}$ is a reconstruction of the testing window $R_w$ by the dynamic model, and $|w|$ is the length of the window.

Anomaly scores may be computed as the ratio of residuals over the training errors:

$$\text{Anomaly}_{stable} = \frac{\text{Residual}_{stable}}{\text{Train}_{stable}}$$

$$\text{Anomaly}_{dynamic} = \frac{\text{Residual}_{dynamic}}{\text{Train}_{dynamic}}$$

Since the stable model is trained from data taken during stable periods, $\text{Anomaly}_{stable}$ will be large during dynamic periods. For the same reason, $\text{Anomaly}_{dynamic}$ will be relatively small during dynamic periods. Based on this, the mode score may be calculated as:

$$\text{mode}_{dynamic} = \frac{\text{Anomaly}_{stable}}{\text{Anomaly}_{stable}}$$

If $\text{mode}_{dynamic}$ is larger than a predetermined threshold, then the system may be determined to be in a dynamic period.

If the system is in a dynamic state, as determined by block 216, processing returns to block 212 and the next time segment of the sensor data is processed. If the system is in a stable state (e.g., if $\text{mode}_{dynamic}$ is below the threshold), block 218 evaluates the anomaly score to determine whether it indicates anomalous behavior of the system 102, for example by comparing the anomaly score to a predetermined threshold, where anomaly scores at or above the threshold may be considered to represent anomalous operation and anomaly scores below the threshold may be considered to represent normal operation. If an anomaly is detected, block 220 may perform an action to respond to the anomaly. If not, then processing may return to block 212 and a new set of measured sensor data may be considered.

Figure 3:
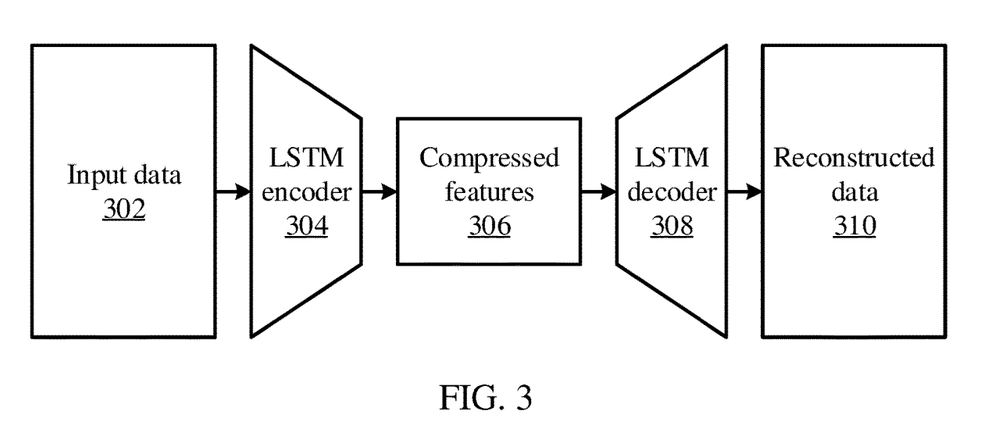
FIG. 3 is a block diagram of a long-short term memory autoencoder architecture that may be used to identify a system's operational mode and to detect anomalies in the system, in accordance with an embodiment of the present invention.

Referring now to FIG. 3, an exemplary LSTM autoencoder is shown. The input data 302 has a first dimensionality, for example represented by the number of different sensors 104 that provide respective time series. An N-dimensional input 302 may therefore include N different time series, each having a length that corresponds to a measurement window.

An LSTM encoder 304 accepts the input 302 and generates an M-dimensional set of compressed features 306, where M<N. The LSTM encoder 304 includes an LSTM part that considers information across the respective sequences of time series data and generates features, for example using information from previous or subsequent elements in a sequence when considering a given element. An encoder part of the LSTM encoder 304 projects the features into an M-dimensional space, for example as an M-dimensional vector.

An LSTM decoder 308 is trained to convert the compressed features 306 back into the original N-dimensional input space, generating reconstructed data 310. If the input 302 is similar to inputs that were seen during the training of the LSTM autoencoder mode, then the reconstructed data 310 is likely to be similar to the input data 302, resulting in a relatively low reconstruction error. If the input 302 is dissimilar to what was seen during training, for example if the system is in an anomalous state, then the reconstruction error may be relatively large.

The LSTM encoder 304 may be a deep neural network that includes LSTM layers to process the time series data and a fully connected layer to compress the input data to the compressed features 306. The LSTM decoder 308 may have the same structure as the LSTM encoder 304, but with the flow of information reversed.

Figure 4:
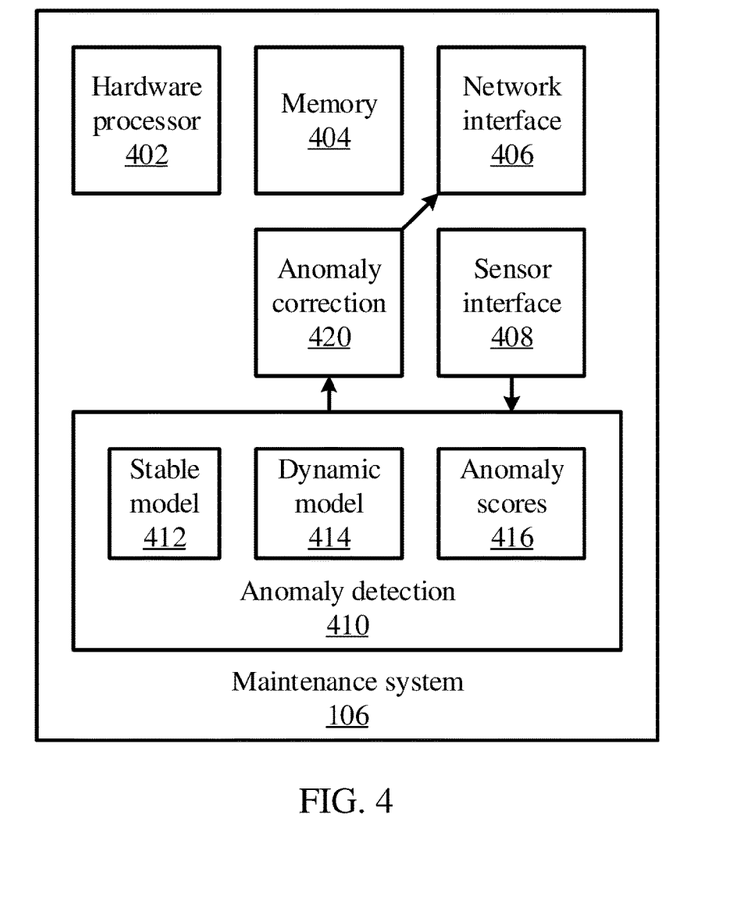
FIG. 4 is a block diagram of a maintenance system that monitors and controls a system and that detects and corrects anomalies in the system, in accordance with an embodiment of the present invention.

Referring now to FIG. 4, additional detail on the maintenance system 106 is shown. The maintenance system 106 includes a hardware processor 402 and a memory 404. The memory may store computer program instructions that, when executed by the hardware processor 402, cause the hardware processor to perform the functions described herein. A network interface 406 communicates with the monitored system 102, for example using any appropriate wired or wireless communications protocol. A sensor interface 408 receives sensor data from the sensors 104, for example in the form of time series information. The sensor interface 408 may receive information from the sensors 104 via the network interface 406 or through one or more dedicated sensor communications connections.

Anomaly detection 410 receives sensor data from the sensor interface, which forms the input to the mode models. The mode models may include stable model 412 and dynamic model 414. During operation, anomaly scores 416 may be determined for the stable model 412 and the dynamic model 414. If the operational mode is determined to be stable, then the anomaly score for the stable model may be output to represent the likelihood that there is an anomalous condition. During a dynamic period, however, no anomaly score may be output.

Anomaly correction 420 may first compare the anomaly score to a predetermined threshold to determine whether an anomaly is indicated. If so, then anomaly correction 420 may automatically perform an action to correct the anomaly, to help the monitored system 102 return to normal operation. To that end, anomaly correction 420 may transmit instructions to the monitored system 102 using the network interface 406, for example instructing the monitored system 102 to change one or more operational parameters.

Figure 5:
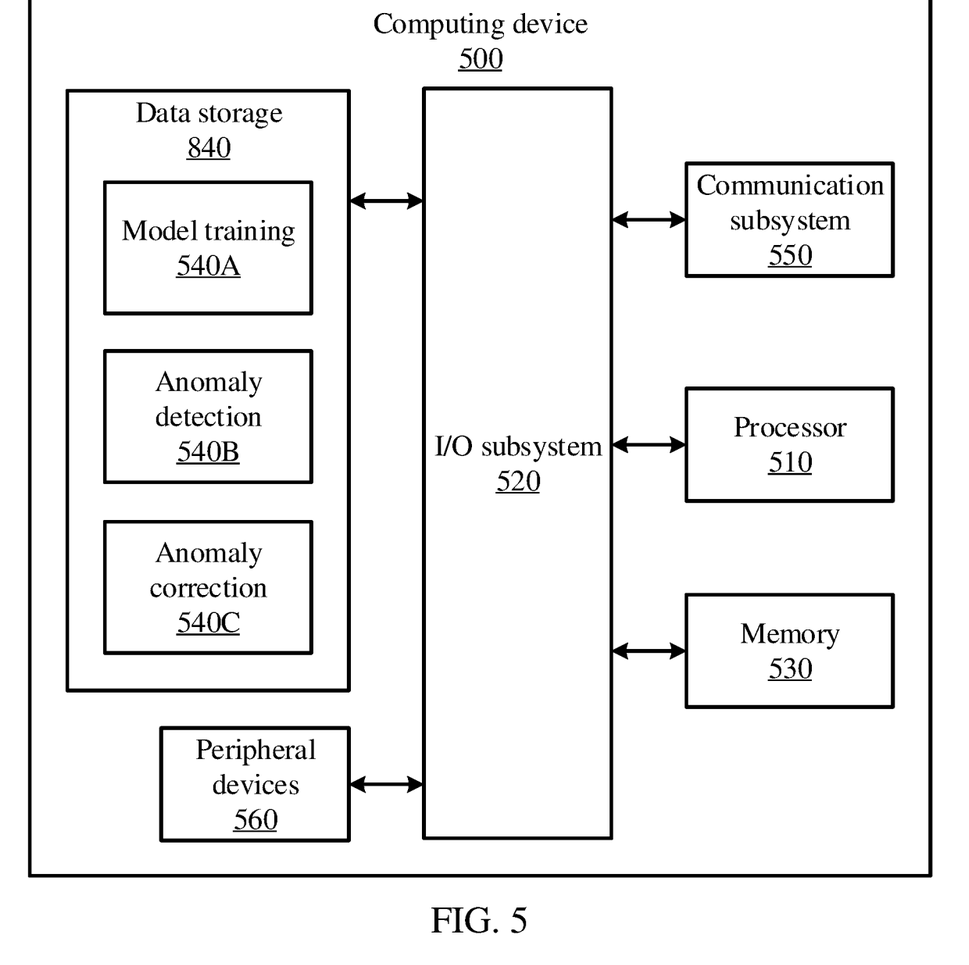
FIG. 5 is a block diagram of a computing device that can be used to detect and correct anomalies, in accordance with an embodiment of the present invention.

Referring now to FIG. 5, an exemplary computing device 500 is shown, in accordance with an embodiment of the present invention. The computing device 500 is configured to perform classifier enhancement.

The computing device 500 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 500 may be embodied as one or more compute sleds, memory sleds, or other racks, sleds, computing chassis, or other components of a physically disaggregated computing device.

As shown in FIG. 5, the computing device 500 illustratively includes the processor 510, an input/output subsystem 520, a memory 530, a data storage device 540, and a communication subsystem 550, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 530, or portions thereof, may be incorporated in the processor 510 in some embodiments.

The processor 510 may be embodied as any type of processor capable of performing the functions described herein. The processor 510 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 530 may be embodied as any type of volatile or non-volatile memory or data storage capable of performing the functions described herein. In operation, the memory 530 may store various data and software used during operation of the computing device 500, such as operating systems, applications, programs, libraries, and drivers. The memory 530 is communicatively coupled to the processor 510 via the I/O subsystem 520, which may be embodied as circuitry and/or components to facilitate input/output operations with the processor 510, the memory 530, and other components of the computing device 500. For example, the I/O subsystem 520 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 520 may form a portion of a system-on-a-chip (SOC) and be incorporated, along with the processor 510, the memory 530, and other components of the computing device 500, on a single integrated circuit chip.

The data storage device 540 may be embodied as any type of device or devices configured for short-term or long-term storage of data such as, for example, memory devices and circuits, memory cards, hard disk drives, solid state drives, or other data storage devices. The data storage device 540 can store program code 540A for performing training using training data that reflects normal operation of the monitored system 102, 540B for detecting anomalies using new sensor data from the monitored system 102, and/or 540C for automatically responding to correct or mitigate the anomalous operation of the monitored system 102. The communication subsystem 550 of the computing device 500 may be embodied as any network interface controller or other communication circuit, device, or collection thereof, capable of enabling communications between the computing device 500 and other remote devices over a network. The communication subsystem 550 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 560. The peripheral devices 560 may include any number of additional input/output devices, interface devices, and/or other peripheral devices. For example, in some embodiments, the peripheral devices 560 may include a display, touch screen, graphics circuitry, keyboard, mouse, speaker system, microphone, network interface, and/or other input/output devices, interface devices, and/or peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 500 are readily contemplated by one of ordinary skill in the art given the teachings of the present invention provided herein.

Figure 6:
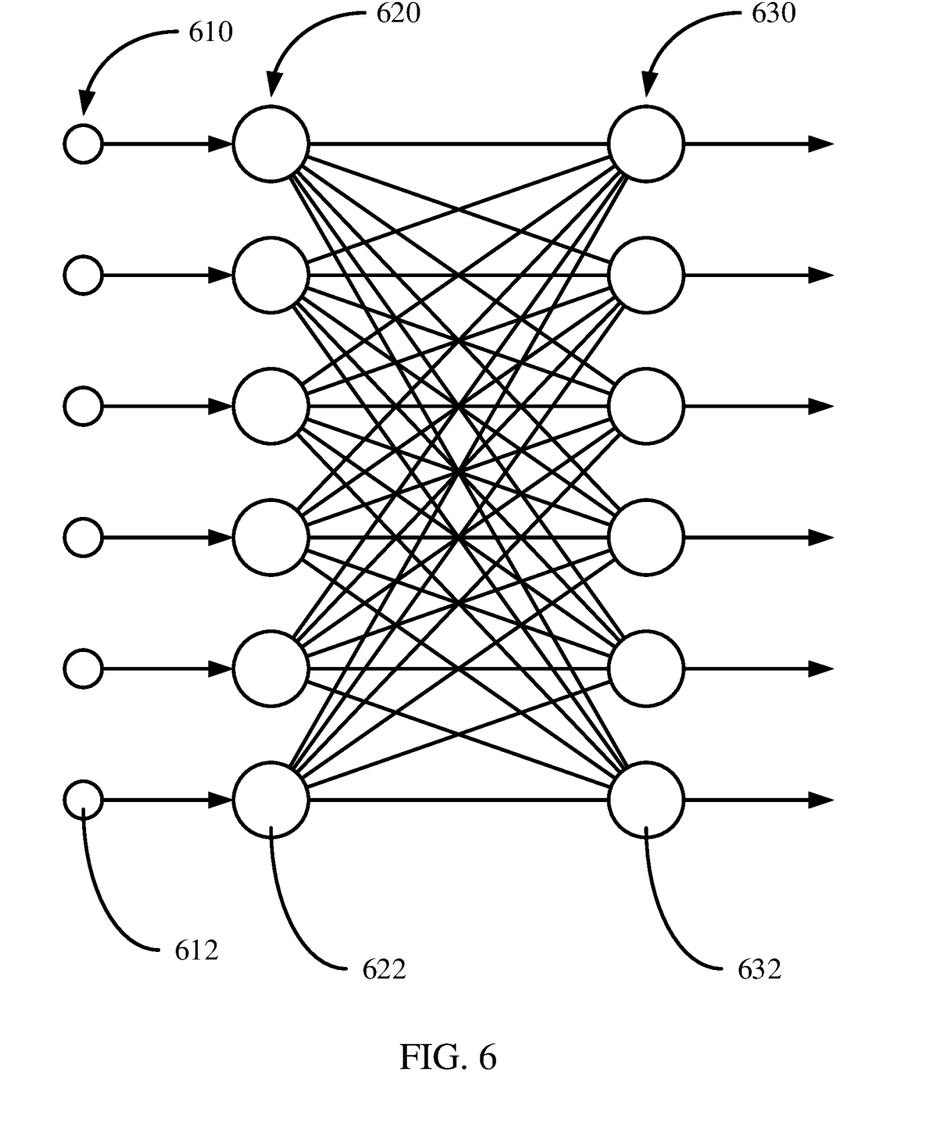
FIG. 6 is a block diagram of an exemplary neural network architecture that can be used to implement anomaly detection, in accordance with an embodiment of the present invention.
Figure 7:
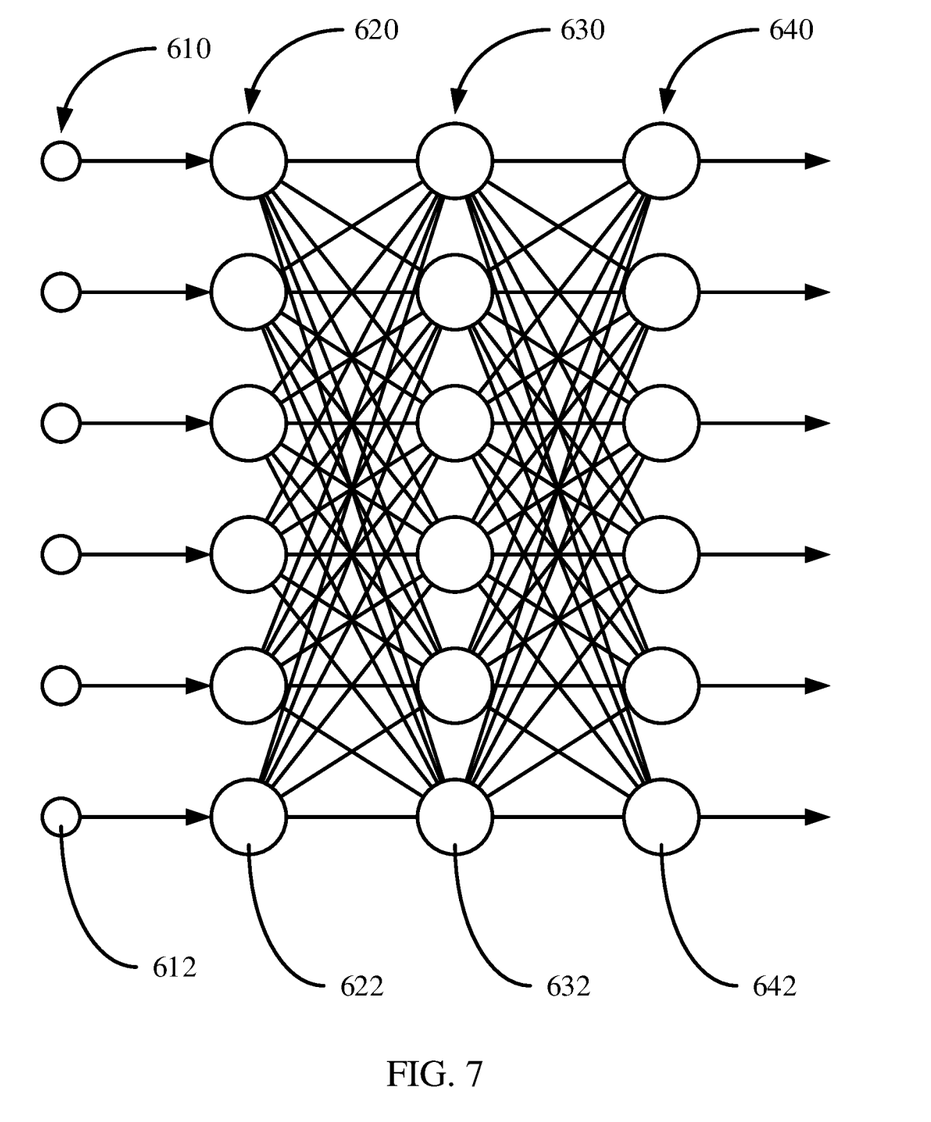
FIG. 7 is a block diagram of an exemplary deep neural network architecture that can be used to implement anomaly detection, in accordance with an embodiment of the present invention.

Referring now to FIGS. 6 and 7, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 620 of source nodes 622, and a single computation layer 630 having one or more computation nodes 632 that also act as output nodes, where there is a single computation node 632 for each possible category into which the input example could be classified. An input layer 620 can have a number of source nodes 622 equal to the number of data values 612 in the input data 610. The data values 612 in the input data 610 can be represented as a column vector. Each computation node 632 in the computation layer 630 generates a linear combination of weighted values from the input data 610 fed into input nodes 620, and applies a non-linear activation function that is differentiable to the sum. The exemplary simple neural network can perform classification on linearly separable examples (e.g., patterns).

A deep neural network, such as a multilayer perceptron, can have an input layer 620 of source nodes 622, one or more computation layer(s) 630 having one or more computation nodes 632, and an output layer 640, where there is a single output node 642 for each possible category into which the input example could be classified. An input layer 620 can have a number of source nodes 622 equal to the number of data values 612 in the input data 610. The computation nodes 632 in the computation layer(s) 630 can also be referred to as hidden layers, because they are between the source nodes 622 and output node(s) 642 and are not directly observed. Each node 632, 642 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 632 in the one or more computation (hidden) layer(s) 630 perform a nonlinear transformation on the input data 612 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for anomaly detection, comprising:
   determining whether a system is in a stable state or a dynamic state based on input data from one or more sensors in the system, using reconstruction errors from a respective stable autoencoder model and dynamic autoencoder model;
   determining that the input data represents anomalous operation of the system with a hardware processor, responsive to a determination that the system is in a stable state; and
   operating the system by performing a corrective action responsive to a determination that the input data represents anomalous operation of the system, wherein the corrective action is selected from the group consisting of halting and/or restarting an application, halting and/or rebooting a hardware component, and changing a network interface's status or settings.

2. The method of claim 1, wherein the stable model and the dynamic model are both trained on data that represents normal operation of the system.

3. The method of claim 1, wherein determining whether the system is in a stable state or a dynamic state further includes calculating a mode score based on the reconstruction scores from the stable model and the dynamic model.

4. The method of claim 3, further comprising determining a stable anomaly score and a dynamic anomaly score using the respective reconstructive errors from the stable model and the dynamic model.

5. The method of claim 4, wherein determining that the input data represents anomalous operation of the system includes determining a mode score as a ratio of the stable anomaly score to the dynamic anomaly score.

6. The method of claim 1, wherein determining that the input data represents anomalous operation of the system includes calculating an anomaly score from the reconstruction score of the stable model and comparing the anomaly score to a predetermined threshold value.

7. The method of claim 1, wherein determining the mode score includes comparing the reconstruction errors from the respective stable model and dynamic model to respective training reconstruction errors for the stable model and the dynamic model.

8. The method of claim 1, wherein the trained stable model and the trained dynamic model are each implemented as respective long-short term (LSTM) autoencoder neural network models.

9. A system for anomaly detection, comprising:
a hardware processor; and
a memory that stores a computer program which, when executed by the hardware processor, causes the hardware processor to:
determine whether a system is in a stable state or a dynamic state based on input data from one or more sensors in the system, using reconstruction errors from a respective stable autoencoder model and dynamic autoencoder model;
determine that the input data represents anomalous operation of the system, responsive to a determination that the system is in a stable state; and
operate the system by performing a corrective action responsive to a determination that the input data represents anomalous operation of the system, wherein the corrective action is selected from the group consisting of halting and/or restarting an application, halting and/or rebooting a hardware component, and changing a network interface's status or settings.

10. The system of claim 9, wherein the stable model and the dynamic model are both trained on data that represents normal operation of the system.

11. The system of claim 9, wherein the computer program further causes the hardware processor to calculate a mode score based on the reconstruction scores from the stable model and the dynamic model.

12. The system of claim 11, wherein the computer program further causes the hardware processor to determine a stable anomaly score and a dynamic anomaly score using the respective reconstructive errors from the stable model and the dynamic model.

13. The system of claim 12, wherein the computer program further causes the hardware processor to determine a mode score as a ratio of the stable anomaly score to the dynamic anomaly score.

14. The system of claim 12, wherein the computer program further causes the hardware processor to calculate an anomaly score from the reconstruction score of the stable model and to compare the anomaly score to a predetermined threshold value.

15. The system of claim 9, wherein the computer program further causes the hardware processor to compare the reconstruction errors from the respective stable model and dynamic model to respective training reconstruction errors for the stable model and the dynamic model.

16. The system of claim 9, wherein the trained stable model and the trained dynamic model are each implemented as respective long-short term (LSTM) autoencoder neural network models.

* * * * *